A. B. CRAIG.
COOLING DEVICE FOR PNEUMATIC TIRES.
APPLICATION FILED AUG. 13, 1912.

1,049,678.

Patented Jan. 7, 1913.

2 SHEETS—SHEET 1.

WITNESSES

Andrew B. Craig,
INVENTOR,

BY

ATTORNEY

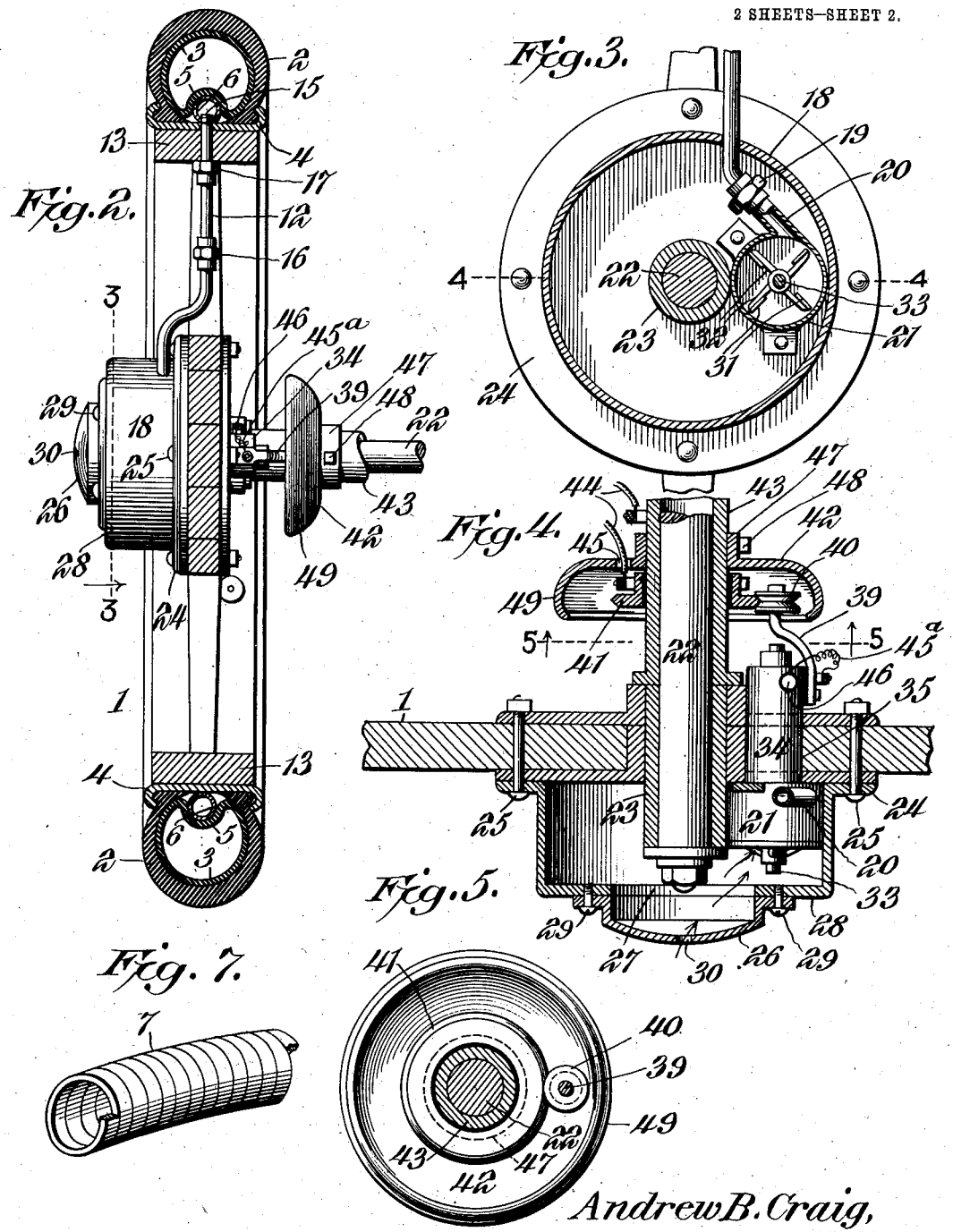

UNITED STATES PATENT OFFICE.

ANDREW B. CRAIG, OF TARKIO, MISSOURI.

COOLING DEVICE FOR PNEUMATIC TIRES.

1,049,678.  Specification of Letters Patent.  Patented Jan. 7, 1913.

Application filed August 13, 1912. Serial No. 714,934.

*To all whom it may concern:*

Be it known that I, ANDREW B. CRAIG, a citizen of the United States, residing at Tarkio, in the county of Atchison and State of Missouri, have invented a new and useful Cooling Device for Pneumatic Tires, of which the following is a specification.

The invention relates to a cooling device for pneumatic tires.
The object of the present invention is to improve the construction of cooling devices for pneumatic tires, more especially the cooling devices shown and described in an application filed by me on or about Sept. 7, 1911, Serial No. 648,233, and in an application filed by me Feb. 12, 1912, Serial No. 674,489, and to provide an exceedingly simple and inexpensive device adapted to dispense with the radiator coils of the said applications, and equipped with means for causing a circulation of air from the atmosphere circumferentially of the tire in close proximity to the inner tube to maintain the temperature within the same sufficiently low to prevent the air within the tire from expanding and causing a blowout or otherwise injuring the tire.

Figure 1:
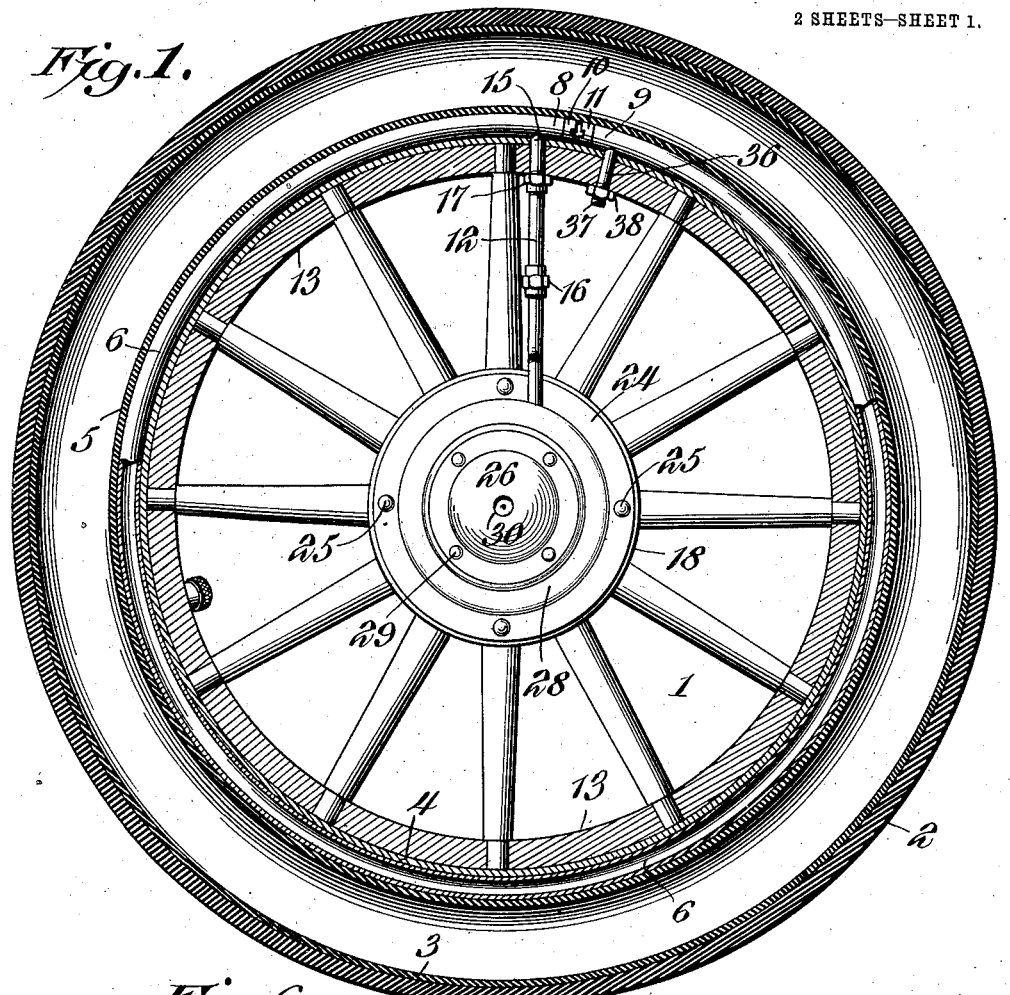
Figure 6:
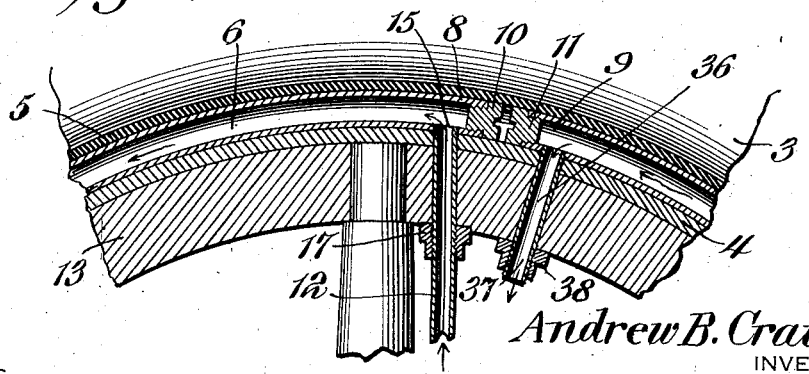

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.
In the drawings:—Figure 1 is a longitudinal sectional view of a pneumatically tired wheel, equipped with a cooling device, constructed in accordance with this invention. Fig. 2 is a transverse sectional view of the same. Fig. 3 is an enlarged detail sectional view on the line 3—3 of Fig. 2. Fig. 4 is an enlarged detail sectional view on the line 4—4 of Fig. 3. Fig. 5 is a detail sectional view on the line 5—5 of Fig. 4.
Fig. 6 is a detail longitudinal sectional view of a portion of the tire, illustrating the arrangement of the supply and exhaust tubes. Fig. 7 is a detail view of a portion of a flexible metallic cooling tube.
Like numerals of reference designate corresponding parts in all the figures of the drawings.

In the accompanying drawings in which is illustrated the preferred embodiment of the invention, 1 designates a wheel having a pneumatic tire 2, consisting of an outer tube or shoe and an inner tube 3, provided at the rim 4 of the wheel with a circumferential fold or tubular portion 5, receiving a circumferential cooling tube 6, which is of less diameter than the interior of the pneumatic tire. The outer tube or shoe of the pneumatic tire is of the clencher type, and engages the side flanges of the rim, but the pneumatic tire may be mounted on a wheel in any other preferred manner. The tubular circumferential portion 5 of the inner tube fits around the cooling tube, and the tire is adapted to be removed from the wheel without detaching the cooling tube. The cooling tube 6, which is preferably constructed of metal, may consist of an ordinary metallic tube, as shown, in Figs. 1, 2 and 6 of the drawings, or it may consist of a flexible metallic tube 7, as illustrated in Fig. 7 of the drawings. When made flexible, it will be constructed of flat wire spirally coiled and having the coils contiguous to one another. The arrangement of the cooling tube on the rim of the wheel and within the tire, as shown, will render the flexible metallic tube sufficiently air tight to form a conduit for circulating the air around the tire in a direction circumferentially of the wheel. The cooling tube 6, which extends circumferentially around the rim substantially the entire length of the tire, has its ends 8 and 9 slightly separated and closed by threaded plugs 10 and 11. The plugs, which have reduced threaded portions, engage interior screw threads of the cooling tube, and the shoulders formed by the reduction of the plugs abut against the ends of the cooling tube. The outer ends or heads of the plugs are provided with grooves to receive the head of a screw driver, or other suitable tool for rotating them. The end 8 of the cooling tube is connected with the outer portion of a radially arranged supply tube 12, extending through the felly 13 and rim 4 of the wheel and having its outer end 15 piercing the cooling tube and communicating with the interior thereof. The radially arranged connecting or supply tube 12 may be composed of separate sections connected by a coupling 16, and the outer section is threaded adjacent to the felly of the wheel and is equipped with a nut 17 seating against the felly. The inner section of the radial connecting tube 12 pierces a cylindrical casing 18 and is connected by a coupling 19 with a tubular branch or tube section 20 of an air pump or fan casing 21. The cylindrical casing 18, which is arranged at the center of the wheel at the outer side thereof, constitutes a false hub section or member and surrounds and receives the outer end of the axle 22 and the axle box or bushing 23, and it is provided at its inner portion with an annular attaching flange 24, secured by bolts 25, or other suitable fastening devices to the wheel. The cylindrical casing is also equipped at the front with a removable plate 26 covering a relatively large opening 27 and detachably secured to the front wall 28 of the cylindrical casing by screws 29, or other suitable fastening devices. The removable plate is adapted when detached to afford access to the interior of the cylindrical casing, and it is provided with an air inlet opening 30 to permit the air to pass into the cylindrical casing from the exterior and enter the eye of the fan casing 21. The rotary pump or fan comprises the said casing 21 and a plurality of blades 31, mounted on radial arms 32 of a shaft 33 of an electric motor 34, extending through an opening 35 in the central portion of the wheel to the inner side or face of the same. When the fan is rotated, air is drawn into the fan casing through the front opening 30 and is driven through the radial connecting tube into the end 8 of the cooling tube and is caused to circulate through the same longitudinally of the tire. The air discharges through a short exhaust tube 36, piercing the felly and rim of the wheel and the end 9 of the cooling tube and communicating with the interior thereof. Instead of driving the air through the short tube 36, the fan may be used as a suction or exhaust fan for drawing the air in through the short tube and discharging it through the eye of the fan and out through the front opening 30 of the cylindrical casing 18. Air from the outside atmosphere is circulated through the cooling tube with sufficient rapidity to maintain the air within the inner tube of the pneumatic tire at a sufficiently low temperature to prevent the same from expanding and causing a blowout or otherwise injuring the tire. The short tube has a threaded outer end 37 for a nut 38, which seats against the felly.

The electric motor, which may be of any preferred construction, is equipped with an arm 39 upon which is mounted a collecting wheel 40, arranged to run on an annular conductor 41 and operating within a circular guard 42. The annular conductor is mounted on an axle sleeve 43 and is insulated therefrom, being connected with a suitable source of current by an insulated wire 44, extending through an opening 45 in the guard 42 and connected with the annular conductor. The current, which may be supplied from either a battery or dynamo, passes to the motor through the annular conductor 41, the collecting wheel 40 and the arm 39, and it may return through the motor casing, the axle box and the sleeve 43 to which a return wire 44 is connected. The arm 39 is insulated from the motor casing and is connected by a wire 45$^a$ with a binding post 46 of the motor. Any other well known manner of wiring may, of course, be employed. The annular conductor is oppositely beveled at its periphery and the collecting wheel is grooved to fit the annular conductor. The guard, which is provided with a central opening to receive the axle sleeve, has a central tubular portion or flange 47, fitting the sleeve 43 and secured to the same by a set screw 48, or other suitable fastening means. The outer or peripheral portion 49 of the guard is curved transversely over the annular conductor and the collecting wheel and is arranged in spaced relation with the same.

No claim is made in the present application to the particular construction of the tire and the arrangement of the same with relation to the cooling tube, as this forms a portion of the subject-matter of the said application, filed Sept. 7, 1911, Serial No. 648,233.

What is claimed is:—

1. The combination with a wheel having a pneumatic tire, of a cooling device therefor including a circumferential cooling tube of less diameter than and located within the pneumatic tire, an air pump mounted on the wheel and connected with the interior of the cooling tube for producing a circulation of air through the interior of the cooling tube, said cooling tube containing within it that portion of the air circulating through the tire, and means for operating the pump.

2. The combination with a wheel having a pneumatic tire, of a circumferential cooling tube of less diameter than and located within the pneumatic tire and having its ends closed to each other, one end of the tube communicating with the atmosphere, a pump mounted on the wheel and connected with the other end of the cooling tube for producing a circulation of air through the same, and means for operating the pump.

3. The combination with a wheel having a pneumatic tire, of a circumferential cooling tube of less diameter than and extending around the tire and having its ends spaced from each other, a short tube connected with one end of the cooling tube and extending through the rim of the wheel and communicating with the outside atmosphere, a pump mounted on the wheel and connected with the other end of the cooling tube, and means for operating the pump.

4. The combination with a wheel having a pneumatic tire, of a hollow casing mounted on the wheel centrally thereof and forming a false hub section or member and provided with an opening communicating with the outside atmosphere, a circumferential cooling tube extending longitudinally of the tire and having its ends spaced from each other, one end of the cooling tube communicating with the outside atmosphere, a pump or fan located within the casing and having an eye communicating therewith, a tube extending from the casing to the rim of the wheel and connecting the pump or fan with the other end of the cooling tube, and means for operating the pump or fan for producing a circulation of air through the cooling tube.

5. The combination with a vehicle wheel having a pneumatic tire, of an electric motor mounted on the wheel and having an arm provided with a collecting wheel, electrical connections comprising an annular conductor provided with means for mounting it on an axle and contacting at its periphery with the collecting wheel, and cooling means for the tire including a pump also mounted on the wheel and actuated by the motor.

6. The combination with a vehicle wheel having a pneumatic tire, of an electric motor mounted on the wheel and having an arm extending from the inner side of the vehicle wheel and provided with a collecting wheel, electrical connections having an annular conductor contacting with the collecting wheel and provided with means for mounting it on an axle, a guard having a central opening to receive the axle and extending over the annular conductor and the collecting wheel, and cooling means for the tire including a pump mounted on the wheel and actuated by the electric motor.

In testimony, that I claim the foregoing as my own, I have hereto affixed my signature in the presence of two witnesses.

ANDREW B. CRAIG.

Witnesses:
GEO. S. LUEKHARDT,
L. H. LUEKHARDT.